(12) United States Patent
Govinde (10) Patent No.: US 9,467,733 B2
(45) Date of Patent: Oct. 11, 2016

(54) INTUITIVE TIMER

(71) Applicant: EchoStar Technologies L.L.C., Englewood, CO (US)

(72) Inventor: Shruthi Govinde, Centennial, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 0 days.

(21) Appl. No.: 14/542,262

(22) Filed: Nov. 14, 2014

(65) Prior Publication Data

US 2016/0142761 A1    May 19, 2016

(51) Int. Cl.
*H04N 5/76* (2006.01)
*H04N 21/433* (2011.01)
*H04N 5/775* (2006.01)
*H04N 21/442* (2011.01)
*H04N 21/466* (2011.01)
*H04N 21/488* (2011.01)
*H04N 21/45* (2011.01)
*H04N 21/458* (2011.01)
*H04N 21/4147* (2011.01)

(52) U.S. Cl.
CPC .......... *H04N 21/4334* (2013.01); *H04N 5/775* (2013.01); *H04N 21/44204* (2013.01); *H04N 21/44218* (2013.01); *H04N 21/44222* (2013.01); *H04N 21/458* (2013.01); *H04N 21/4532* (2013.01); *H04N 21/4667* (2013.01); *H04N 21/4668* (2013.01); *H04N 21/4882* (2013.01); *H04N 21/4147* (2013.01)

(58) Field of Classification Search
CPC .................. H04N 21/47214; H04N 21/4532; H04N 21/4667; H04N 21/4334; H04N 21/44204; H04N 21/44222; H04N 21/4668; H04N 21/44218

USPC ......................................... 386/293, 295, 296
See application file for complete search history.

(56) References Cited

U.S. PATENT DOCUMENTS 6,769,127 B1    7/2004  Bonomi et al.
7,003,792 B1 *  2/2006  Yuen .................. H04N 5/44543
                                                348/E5.105

(Continued)

FOREIGN PATENT DOCUMENTS

CN       1579089 A      2/2005
EP     2 768 233 A1     8/2014

(Continued)

OTHER PUBLICATIONS

Extended European Search Report, dated May 23, 2011, for European Application No. EP 08837291.7-2223 / 2206343, 8 pages.

(Continued)

*Primary Examiner* — David Harvey
(74) *Attorney, Agent, or Firm* — Seed IP Law Group PLLC (57) ABSTRACT

A method for determining a program of interest to a user and setting a timer to automatically record the program of interest. The method can interpret user inputs and watching habits, such as whether or not a user is present, to determine if a program being displayed for a user is a program of interest to the user. Once a program of interest is identified, a timer is set to record the next scheduled broadcast of the program of interest for the user. The user can then be notified, either before or after the timer is activated, that the automatic timer was set to record the program, and the user given the option of whether or not to keep the timer or recording.

20 Claims, 8 Drawing Sheets

(56) References Cited

U.S. PATENT DOCUMENTS

| | | | |
|---|---|---|---|
| 7,877,765 B2* | 1/2011 | Bhogal | H04N 5/782 725/21 |
| 7,882,528 B1* | 2/2011 | Taylor | H04N 5/44543 725/46 |
| 7,912,824 B2 | 3/2011 | Anguiano | |
| 7,954,120 B2 | 5/2011 | Roberts et al. | |
| 8,132,205 B2 | 3/2012 | VanDuyn et al. | |
| 8,768,147 B2* | 7/2014 | Ellis | 386/291 |
| 8,838,516 B2 | 9/2014 | Kunjithapatham et al. | |
| 2002/0174429 A1 | 11/2002 | Gutta et al. | |
| 2003/0061239 A1 | 3/2003 | Yoon | |
| 2003/0084448 A1 | 5/2003 | Soundararajan | |
| 2003/0217365 A1 | 11/2003 | Caputo | |
| 2003/0220100 A1 | 11/2003 | McElhatten et al. | |
| 2004/0078823 A1 | 4/2004 | Schlarb et al. | |
| 2004/0261096 A1 | 12/2004 | Matz | |
| 2005/0028208 A1 | 2/2005 | Ellis et al. | |
| 2005/0120369 A1 | 6/2005 | Matz | |
| 2005/0149964 A1 | 7/2005 | Thomas et al. | |
| 2005/0160461 A1* | 7/2005 | Baumgartner | G11B 27/32 725/52 |
| 2005/0210530 A1 | 9/2005 | Horvitz et al. | |
| 2005/0246738 A1 | 11/2005 | Lockett et al. | |
| 2006/0129547 A1 | 6/2006 | Yamamoto et al. | |
| 2006/0184967 A1 | 8/2006 | Maynard et al. | |
| 2007/0033607 A1* | 2/2007 | Bryan | H04H 60/27 725/10 |
| 2007/0154163 A1* | 7/2007 | Cordray | H04N 21/6187 386/278 |
| 2007/0192796 A1 | 8/2007 | Iwabuchi et al. | |
| 2007/0244747 A1 | 10/2007 | Nikovski | |
| 2008/0059884 A1* | 3/2008 | Ellis | H04N 5/44543 715/721 |
| 2009/0019488 A1 | 1/2009 | Ruiz-Velasco et al. | |
| 2009/0077589 A1* | 3/2009 | Boyer | H04N 5/44543 725/46 |
| 2009/0100463 A1 | 4/2009 | St. John-Larkin | |
| 2009/0133081 A1* | 5/2009 | Sakai | H04N 7/173 725/105 |
| 2009/0259518 A1 | 10/2009 | Harvey et al. | |
| 2010/0122293 A1* | 5/2010 | Craner | H04N 5/44582 725/40 |
| 2010/0192172 A1 | 7/2010 | Thomas et al. | |
| 2010/0251304 A1 | 9/2010 | Donoghue et al. | |
| 2011/0211813 A1* | 9/2011 | Marks | G06F 17/3089 386/297 |
| 2011/0214147 A1 | 9/2011 | Kashyap et al. | |
| 2012/0096488 A1* | 4/2012 | Wei | H04N 21/44016 725/34 |
| 2012/0117017 A1* | 5/2012 | Phillips | H04N 21/44204 706/50 |
| 2012/0331494 A1 | 12/2012 | Pontual et al. | |
| 2013/0097623 A1* | 4/2013 | Lai | H04N 21/4223 725/9 |
| 2013/0238544 A1 | 9/2013 | Kunjithapatham et al. | |
| 2014/0089953 A1 | 3/2014 | Chen et al. | |
| 2014/0189743 A1 | 7/2014 | Kennedy et al. | |
| 2014/0229990 A1* | 8/2014 | Lee | H04N 21/26283 725/46 |
| 2014/0282636 A1 | 9/2014 | Petander et al. | |
| 2015/0143413 A1* | 5/2015 | Hall | G06Q 30/0271 725/34 |
| 2016/0037204 A1* | 2/2016 | McSweeney | H04N 21/4263 725/39 |

FOREIGN PATENT DOCUMENTS

| | | | |
|---|---|---|---|
| GB | 2476136 A | | 6/2011 |
| JP | 11-220673 A | | 8/1999 |
| JP | 2000-293539 A | | 10/2000 |
| JP | 2001-223959 A | | 8/2001 |
| JP | 2003-189333 A | | 7/2003 |
| JP | 2003-284008 A | | 10/2003 |
| JP | 2003-319366 A | | 11/2003 |
| JP | 2004-297605 A | | 10/2004 |
| JP | 2006-121252 A | | 5/2006 |
| JP | 2006-222574 A | | 8/2006 |
| JP | 2009-021644 A | * | 1/2009 |
| KR | 10-2004-0102961 A | | 12/2004 |
| WO | 99/45700 A1 | | 9/1999 |
| WO | 02/25939 A2 | | 3/2002 |
| WO | 2009/048753 A1 | | 4/2009 |

OTHER PUBLICATIONS

Communication pursuant to Article 94(3) EPC, dated Nov. 21, 2013, for European Application No. 08 837 291.7-1910, 5 pages.

International Preliminary Report on Patentability, issued Apr. 13, 2010, for International Application No. PCT/US2008/077914, 5 pages.

International Search Report and Written Opinion, mailed Dec. 4, 2008, for International Application No. PCT/US 08/77914, 7 pages.

International Search Report and Written Opinion, mailed May 9, 2016, for International Application No. PCT/US2016/013685, 14 pages.

Malaysian Search Report, dated Feb. 28, 2013, for Malaysian Application No. PI 2010001501, 1 page.

Sanchez et al., "User interest modeling for social TV-recommender systems based on audiovisual consumption," *Multimedia Systems* 19: 493-507, 2013.

Office Action, dated May 5, 2011, for Chinese Application No. 200880111229.5, 4 pages. (English Translation).

Notice of Preliminary Rejection, issued Aug. 16, 2011, for Korean Application No. 10-2010-7007674, 7 pages. (with English Translation).

Office Action, mailed Aug. 26, 2011, for Mexican Application No. MX/a/2010/003736, 3 pages. (English Translation).

Office Action, dated Oct. 4, 2011, for Australian Application No. 2008311142, 2 pages.

Notice of Rejection Ground, mailed Jun. 5, 2012, for Japanese Application No. 2010-528938, 4 pages. (English Translation).

Office Action, dated Oct. 12, 2012, for Canadian Application No. 2,701,920, 3 pages.

Office Action, dated Nov. 27, 2012, for Chinese Application No. 200880111229.5, 5 pages. (English Translation).

Su et al., "A Survey of Collaborative Filtering Techniques," *Advances in Artificial Intelligence*, 2009, Article ID 421425, 19 pages, 2009.

Navarro, "Scheduled Programming Recommendation System," U.S. Appl. No. 14/493,038, filed Sep. 22, 2014, 49 pages.

International Search Report and Written Opinion, mailed Dec. 7, 2015, for International Application No. PCT/US2015/051269, 13 pages.

* cited by examiner

INTUITIVE TIMER

BACKGROUND

1. Technical Field

Embodiments of the disclosure are directed to a method for automatically recording an episode of a program of interest to a user and, in particular, to methods for setting program timers for use in digital video recorders.

2. Description of the Related Art

Media services offer entertainment, news, sports and other broadcast programming over cable, satellite and Internet streaming links. The number of channels available now numbers in the thousands, reflecting the highly varied interests among different users. The nature of broadcast programming means that certain programs are broadcast during certain scheduled time slots, often known well in advance. These programs are often catalogued for viewer access in electronic programming guides. The viewer can then find a show they desire to watch by navigating the electronic programming guide and selecting an episode of a program to watch. This type of program scheduling does not compensate for individual scheduling conflicts though, and only broadcasts an episode of a program during the scheduled time slot.

As home entertainment technology has advanced, timers were developed that allowed a user to record an episode of a program of interest during a time period in which the user was not able to watch the broadcast. The earliest consumer version of this technology was the Videocassette Recorder (VCR) which allowed a user to set a timer to start the VCR recording after a certain time interval had passed. The VCR would wait the set amount of time, and then begin recording a selected channel of an input stream of programming until a Video Home System (VHS) cassette ran out of space. The VHS cassette would store the media until deleted or overwritten by the user. This meant that an episode recorded while the user was away from the system could be watched at a later time chosen by the user.

The recording timer technology matured with the introduction of the Digital Video Recorder (DVR). The DVR enabled higher level processing to be done to determine when to record an episode of a program based on user instruction. For instance, a user could set a timer for a program they were currently watching, even if they were unaware of the next scheduled showing of an episode of that program. Timers could also be associated with a specific program in a schedule. If the schedule changed and the program was placed in a new time slot, the DVR could modify the timer to capture episodes of the program in its new time slot.

Users do not always set timers for programs they want to record though. Programs that a user is interested in may not have a timer set because the user accidentally forgot to set the timer or unforeseen circumstances prevented the timely setting of the timer. In addition, as the use of timers has increased, it has become increasingly difficult to manage timers such that a user can ensure that every episode of a program they are interested in is recorded when they are unable to watch the original broadcast. Because broadcast programming is only accessible during the scheduled showing time, a missed timer means a missed watching of an episode of a program.

BRIEF SUMMARY

The present disclosure relates to a method for setting automatic timers for a user. A system collects an input media stream containing a plurality of programs, such as a cable, satellite, or Internet broadcast stream, and displays content based on user input, such as selecting a particular channel. In addition to receiving and responding to user commands, such as channel or volume selection, the system stores and processes user commands to compute a level of interest a user may have associated with a particular program, such as an entertainment, news, sports or other broadcast program.

The system can then use the level of interest computed for a program to determine if the program is a program of interest. If the system determines that a program is a program of interest to a user, then the system will automatically set a timer to record the next scheduled episode in that series of programs. The process for determining what a program of interest is may include weighing a number of factors, including user watching habits and presence indicators. For instance user commands while a program is being watched can be indicative of user presence. The timing of commands can also be indicative of user presence and interest during a specific episode of the program. Alternatively, certain user commands can be indicative of differing levels of interest in a particular program being watched.

If the user shows a high level of interest in a particular program, an automatic timer is set to automatically record the next episode in a series of the program. The user can be notified of any automatic timers before or after they are activated. If a user turns on a display prior to the activation of an automatic timer, the system may generate a notice or prompt for the user, informing them of the automatic timer and suggesting a specific action or requesting an input of what to do with the timer. If the display is turned on after the activation of the timer, a similar notice or prompt may appear, but action may be suggested or input requested on managing the recording instead of the timer.

In one embodiment, the method includes a system receiving a plurality of programs at a receiver and displaying a selected episode of a program to be watched by a user. The system then generates a log of selected programs. The log of selected programs can be populated, using a background process, with data indicating a determined level of user interest. The level of user interest can be ascertained by determining if the user is present, by detecting user commands during the displaying of a first episode of the selected program. The programs in the log of selected programs can then be ranked based on their respective level of user interest. Those programs that meet a threshold are then marked as programs of interest that the receiver will record during a second episode of the program, if the user does not select the second episode to watch.

Automatically setting a timer to record programs the system determines to be of interest to the user prevents users from inadvertently missing shows that they are interested in. If a show is missed by accidentally forgetting to set a timer before going on vacation, or having to work late, the receiver automatically records the show for the user. If the user loses track of which shows they are following because they follow numerous shows, the system is capable of automatically recording shows they have expressed an interest in. The system is also capable of learning from previous recordings and how they are watched and managed, compensating for changes in watching habits of a user and fine tuning the determination of programs of interest.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles may not be drawn to scale, and some of these elements may have been enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with integrated circuits and semiconductor manufacturing/packaging processes have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Figure 1:
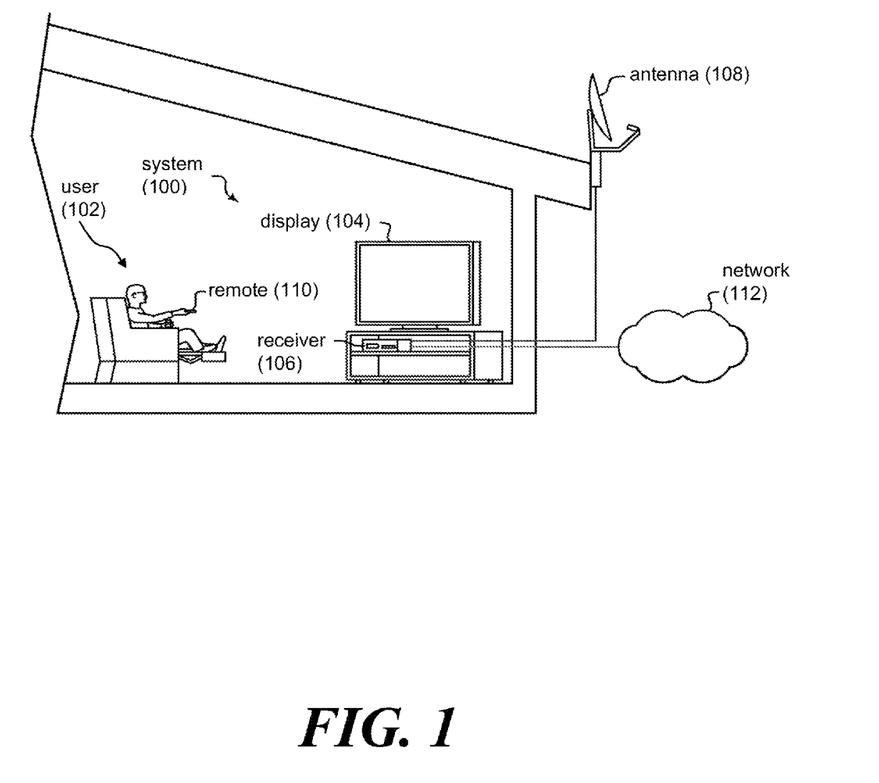
FIG. 1 is a view of a system with a receiver implementing one embodiment of the disclosure.

Referring to the Figures, FIG. 1 is a view of a system with a receiver implementing one embodiment of the disclosure. The system 100 is controlled by a user 102 to watch programming provided by a service provider. The user 102 watches programming on a display 104. Programming is received from a service provider at a receiver 106. The receiver 106 may be a single device that receives, processes and stores programming provided by the service provider (e.g., a satellite TV receiver and digital video recorder), or may be a system of connected devices. In one embodiment the programming is received at the receiver 106 through an antenna 108. In other embodiments the programming is communicated to the receiver through cable transmission or other communicative means.

In one embodiment the user 102 controls the receiver 106 with a remote 110. The remote 110 may be any number of devices including a dedicated remote, a universal remote, or an application on a separate device, such as a mobile phone, tablet, or laptop computer. In another embodiment, the functions of the remote 110 may be integrated into the receiver 106.

The receiver 106 may optionally be connected to a network 112. The receiver 106 may connect to the network to get data packets or to send data packets. The types of information to be sent can include programming viewing history, user input logs, error logs, or other types of information. The types of information to be received include programming guide information, viewing community data, additional programming content, or other types of information. The connection to the network 112 may be through the antenna 108 or may be a separate and distinct connection, for example an Ethernet connection to a home Internet access point.

The display 104 may be a television set or video display that can contain an integrated television converter device, for example, an internal cable-ready television tuner housed inside a television. The display 104 may alternatively be connected to an external television converter device such as an external set top box coupled to a television.

In one embodiment the receiver 106 provides a plurality of programs from which the user may use the remote 110 to select a specific episode of a program to watch. In selecting an episode of a program to watch, the receiver 106 enters the program in a log of selected programs representing the viewing history of the user 102. The log may also be configured to have additional fields to receive data correlated with each entry.

The receiver 106 collects information on the selected episode of the program in one embodiment. In an alternate embodiment, information is collected by a server on the network 112. The information may be stored by the receiver 106 or the server on the network 112.

The user presence indications and level of user interest indications are discerned from any number of interactions between the user 102 and the receiver 106. User commands that may be used to determine level of interest include play, pause, fast forward, skip forward, rewind, skip back, info, channel up, channel down, volume up, volume down, or any other user provided command. In an alternate embodiment, user presence may be detected from other interactions between the receiver 106 and its external environment. For instance, the receiver 106 is able to detect the display 104 being turned off and on, or the display 104 selecting the receiver 106 as the input source from a plurality of input sources. Furthermore, the receiver 106 may be able to receive user presence indicators from the network or a sensor capable of detecting user presence.

Having collected user presence indicators and level of user interest indications, the receiver 106 can then rank the programs according to how well they satisfy the presence indication criteria or level of user interest indication criteria. The ranking may be done either as a relative comparison between programs, or can be a ranking against a set benchmark. The receiver 106 then reviews the ranking to determine if the program is a program of interest to the user.

The receiver 106 ranks different user inputs differently, in one embodiment. The receiver 106 may group different inputs into different interest groups, such as a high interest group, a medium interest group, or a low interest group. Some inputs or combinations of inputs would be grouped into each category. For instance, a pause command from the user 102 followed by a play command may indicate a high level of interest. Access to the information menu for a particular program also shows a high level of user interest. Increasing the volume may indicate a medium level of interest, and a volume down may indicate a low level of interest. Combinations of inputs may also be grouped into different inputs, such as a pause at the start of a commercial break, followed by a fast forward to skip the commercial, and then play at the start of the episode of the program being one group of commands that shows a high level of interest. Some user commands that may be included in the groupings include play, pause, fast forward, skip forward, rewind, skip back, info, channel up, channel down, volume up, volume down, or any other user provided command. In an alternate embodiment each command or combination of commands is given its own ranking.

As another example, if the user 102 presses any button on the remote 110, the receiver 106 can determine that the user 102 is watching the selected episode of the program. This shows at least a medium level of interest. If the button press is a change of channel command without a return to that previous program, then the receiver 106 may determine that the user 102 is not interested in the previously selected episode of the program. Conversely, if the change of channel command follows a previous change of channel command, and is to return to a previously selected episode of a program, then the change of channel commands may be grouped and used to determine that a user 102 is highly interested in the selected episode of the program. This determination may be further supported by correlating the channel change commands with advertisement showing times.

The overall ranking of a program may be determined from a number of methods. Some methods for determining the ranking of a program include comparing the highest ranked user input for a particular episode of the program to a threshold or to other watched programs. In another embodiment, the combination of some or all of the ranked user inputs associated with a program is compared to a threshold or to other watched programs.

The receiver 106 may be able to determine programs of interest to the user 102 by a background process without interrupting the watching experience of the user 102. Programs of high interest may fulfill any number of criteria. In one embodiment, a high level of interest may be indicated by first run episodes of the program being selected to watch in two consecutive instances. In another embodiment, the high level of user interest may be indicated by user presence indicators.

In one embodiment, the receiver 106 would annotate which programs were determined to be programs of interest to the user 102 by creating an interest marker in the log of selected programs. Any other methods for identifying a program of interest from among a log of selected programs may also be used. Once a program has been identified as a program of interest, the receiver 106 would set a timer to record the next scheduled episode of that program. Timers may be implemented by any of a number of methods. In one instance a programming guide is scanned for the next episode of that program, and a recording event is scheduled based on the programming guide. The recording event would then begin recording the episode of the program at the start time of the recording event. In an alternate embodiment, the timer may be implemented by the receiver 106 reviewing a time period of a programming guide at the beginning of the time period to see if any episodes of the program that had been identified as a program of interest were scheduled to be shown during that time period.

In an alternate embodiment, the setting of a timer by any method could be conducted on the network 112. The timer would be calculated on the network, and then either executed on the network or transmitted to the receiver to be executed locally. If the timer were executed on the network 112, the network 112 may either send an instruction to the receiver 106 to record the episode of the program when the timer executed, or may record the show on the network 112 and send the recorded show to the receiver 106. Shows recorded on the network 112 may be sent to the receiver 106 either by the network 112 at a certain time after being recorded, upon request from the user 102, or on request from the receiver 106 using a background process.

With a timer set, the receiver 106 continues to operate normally until the timer is scheduled to execute. In one embodiment, when the timer reaches its scheduled execution time, the receiver 106 determines if the user 102 is watching the episode of the program of interest. If the user 102 is not watching the episode of the program of interest, then the receiver 106 records the episode of the program. If the user 102 is watching the episode of the program of interest, then the receiver 106 deletes the timer and does not record the episode of the program of interest, in one embodiment.

In another embodiment, the receiver records the episode of the program of interest when the timer is scheduled to execute. The receiver 106 then determines if the episode of the program was watched by the user 102 after recording of the episode of the program of interest has been completed. If the episode of the program was watched, then the receiver 106 may discard the recording. If the episode of the program was not watched, then the receiver 106 may instead prompt the user 102 to choose to save or discard the recording the next time the user 102 watches a program on the display 104. Optionally, the user 102 may be given the option to begin playback of the recording the next time the user 102 watches a program on the display 104.

One of the benefits of the present embodiment is that the interest level in a series of programs can be determined from watching only a single program. Other prior art techniques require the user to repeatedly watch the same program or a similar type of program, and collect data of the user's viewing habits over several days, and perhaps over several weeks and months. This has the disadvantage that if the user has watched a single program in which they have an extremely high interest, the system will not have the data sufficient to record a subsequent episode in that series of programs. One of the advantages of the techniques described herein is that data can be collected during a single watching of a single program by the user, and based on the data from just a single viewing of that program, there will be sufficient data collected that a subsequent episode in the same series of programs will be recorded.

As described herein, the programs which have been provided as an example are one program in a series of similar programs. In the electronic program guide, the metadata which is broadcast with a particular program carries an indication of whether or not it is an episode within a series of programs. Examples of a series of programs include such shows as Friends, How I Met Your Mother, House, Doctor Who, CSI, or the like. In particular, the metadata indicates that the particular program being shown is a continuing series of programs in which the events of one program are carried forward into a subsequent program which is broadcast at a later time, such as a week later. The electronic programming guide within the metadata will carry an indication of the fact that it is a series of programs, and will also indicate which episode it is in the program and which season of the program. For example, it may indicate episode 3 of season 2 of Friends. As another example, it may indicate that it is season 4, episode 3 of Game of Thrones. Thus, by the indication in the metadata of the episode number and the season number, this provides a clear indication to the program in the receiver that it is a series of programs that has a sequence of episodes. If the user shows a high level of interest in any one single episode that they have viewed, even if it is just a single episode, then this will be sufficient that all episodes in that series of selective programs will be recorded. Of course, the user, by inputting selected commands to the receiver, can cancel the automatic subsequent recording of additional episodes within that selected series of programs so as to delete the automatic timer.

In one alternative embodiment, it is also possible to consider one-time showing movies that have identical characters in subsequent other movies to also be considered as a sufficiently high level of interest that subsequent movies which are not in the same series of programs may be recorded. In this alternative embodiment, for example, if a user shows a very high level of interest in a program featuring both Bob Hope and Bing Crosby. For example, Bob Hope and Bing Crosby made a series of movies called Road to . . . These include Road to Singapore, Road to Morocco, Road to Bali, and the rest. These films have the characteristic they all starred both Bob Hope and Bing Crosby, along with a famous female character, usually Dorothy Lamour. Thus, if a subsequent movie is shown which has the characteristic of those three stars, Bob Hope, Bing Crosby, and Dorothy Lamour, then the program would automatically be recorded because it matches a sufficient number of characteristics of a single prior showing of a single movie in which the user showed a high level of interest. There may be other instances in which the user may show a sufficient high level of interest in a single showing of a single movie that the receiver will look for subsequent showings of subsequent movies which have a high level of overlap in the content of the movie in which there was a high level of interest and will automatically record such movies even though they are not in a series of programs or in an episode, according to this alternative embodiment.

In one embodiment, the storage of the recording of the episodes of the program of interest is limited by time or storage capacity. The receiver 106 may have a timer set for a fixed amount of time, 1 year for example, or 52 programs from that series, in which the receiver will store the recording of the episode of the program of interest. The fixed amount of time can be any amount of time, and in some embodiments is configurable by the user 102. The receiver 106 may also have a limit on the amount of storage space allocated to automatic recordings of programs of interest. For example, a portion of a 500 GB hard drive in the receiver 106 may be allocated to automatically record programs identified as programs of interest. The receiver 106 may operate as a first-in first-out buffer once the capacity of the allocation has been reached. The capacity of the allocation may be fixed, user configurable, or dynamic, based on the amount of storage used by the user 102.

FIG. 1 illustrates a satellite television service system as one embodiment. The present disclosure is equally applicable to cable television systems, broadcast television systems, Internet streaming media systems, or other television or video distribution systems that include user hardware, in the form of a receiver or set top box that is supported by the media provider or by a third party maintenance service provider in one embodiment. Such hardware can also include, for example, Digital Video Recorder (DVR) devices or Digital Video Disc (DVD) recording devices or other accessory devices inside, or separate from, the receiver 106.

One skilled in the art will recognize that the present disclosure can also apply to other types of systems that offer smart menu services to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

Figure 2:
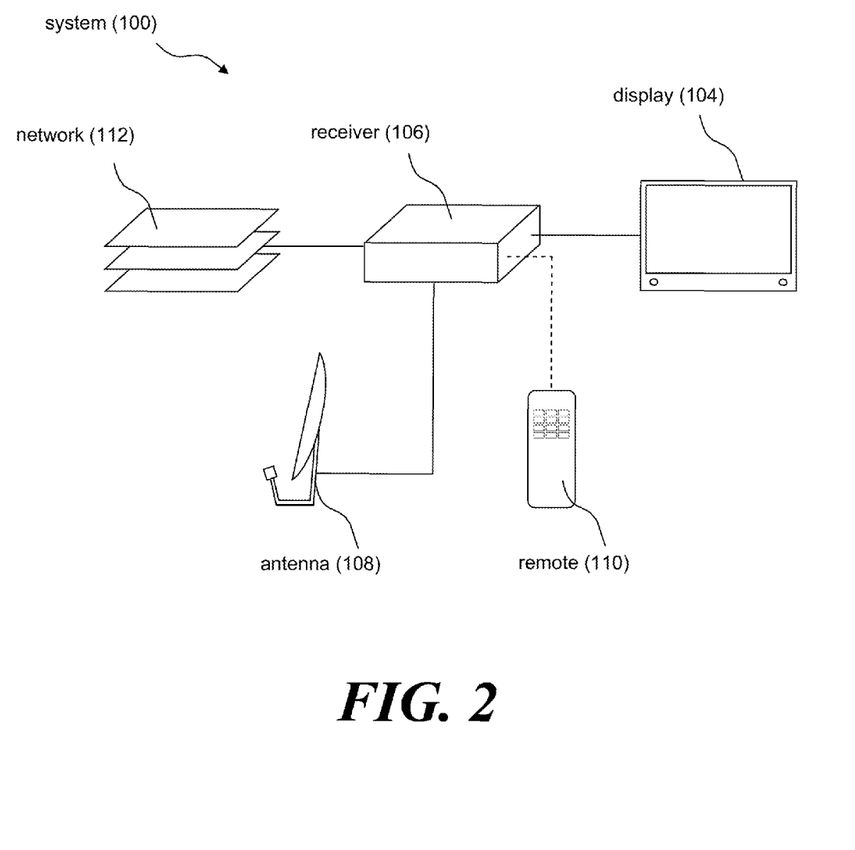
FIG. 2 is a diagram of the system of FIG. 1.

FIG. 2 is a diagram of the system of FIG. 1. The diagram shows the system 100 having the receiver 106 as the central node of the system 100. In the shown embodiment, the receiver is coupled to the display 104, the antenna 108 and the network 112 by signal lines, and the receiver 106 is communicatively coupled to the remote 110. In other embodiments, any of the devices may be communicatively coupled to the receiver 106 by a physical connection or an over-the-air transmission. In an alternate embodiment, the devices may be coupled through one another. For example, the remote 110 may control the receiver 106 by sending commands to the display 104 which then passes the commands to the receiver 106. Additionally, the antenna 108 may be coupled to the network 112 which then passes the programs received at the antenna to the receiver 106.

Figure 3:
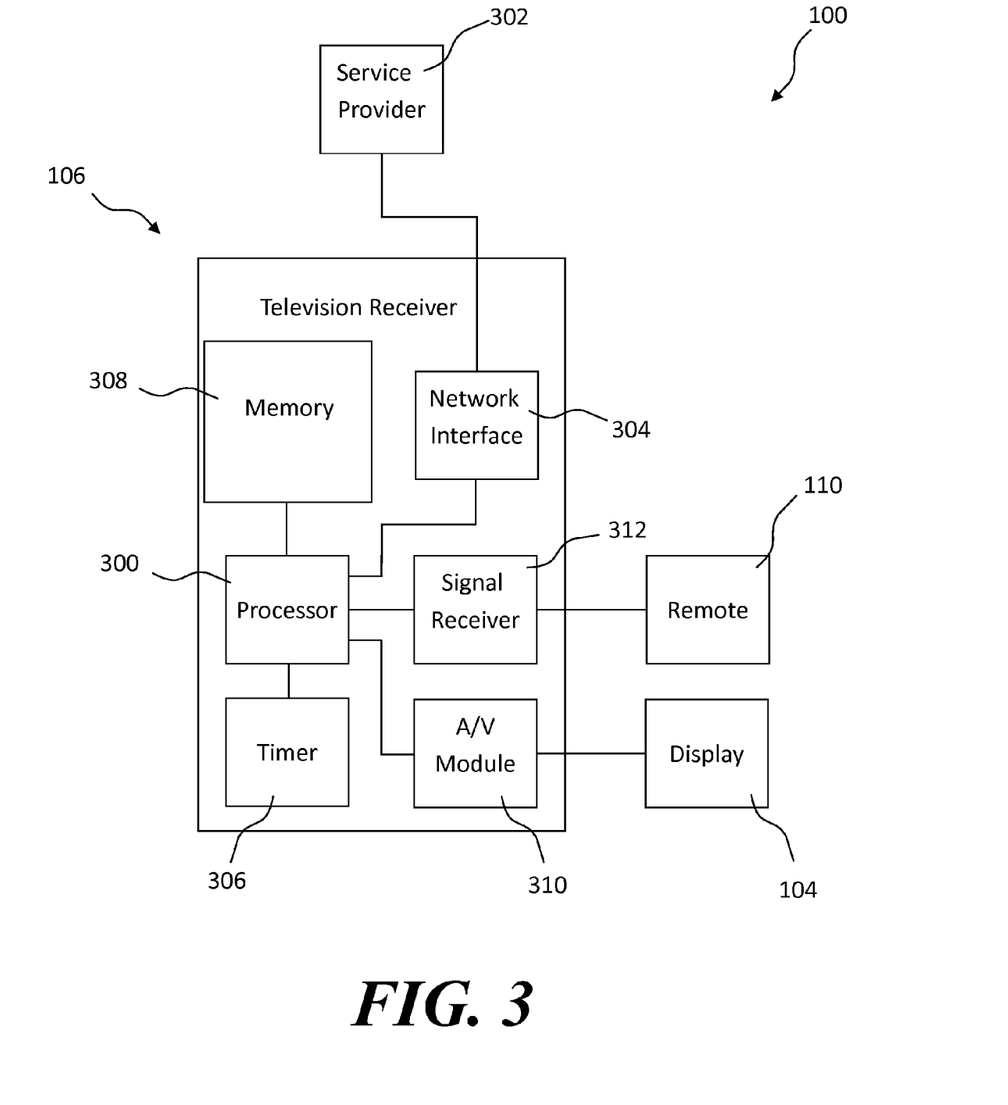
FIG. 3 is a functional block diagram of the receiver of FIG. 1.

FIG. 3 is a functional block diagram of the receiver of FIG. 1. The system 100 includes the receiver 106 coupled to the display 104, the remote 110 and a service provider 302. The service provider 302 may be coupled to the receiver through an antenna, a satellite dish, or some other means of communication.

The receiver 106 includes a number of functions which are shown in FIG. 3. The receiver 106 has a processor 300 that processes a plurality of programs received from the service provider 302 and decoded by the network interface 304. The network interface 304 may include analog to digital conversion steps, protocol parsing, or any other interface bridging steps between the processor 300 and the service provider 302. The processor 300 is also coupled to a timer 306. The timer 306 may be a simple oscillator, or may include more advanced functions, like the ability to trigger flags in the processor 300 at certain times.

The processor 300 is also coupled to a memory 308. The memory is used to store recordings of the program of interest, as well as any recordings or data normally stored by the receiver 106. Memory 308 may also be used for recordings requested by the user 102, the log of selected programs, or any other data for use by the system 100.

The processor 300 outputs a selected episode of a program from the plurality of programs received from the service provider 302. The selected episode of the program is transmitted to the display 104 through an audio/visual (A/V) module 310 that translates an output of the processor 300 into a media format readable by the display 104. The AV module 310 may be a video graphics card, an integrated graphics device, or another type of media interface.

The user 102 sends instructions to the processor 300 through the signal receiver 312 by operating the remote 110, in one embodiment. The user may command the receiver to turn on, turn off, change volume, change channel, display a guide, select an option, change an option, play, pause, fast forward, rewind, skip forward, skip back, enter a numerical digit, change source, display info, change device control, or any other user command.

Figure 4:
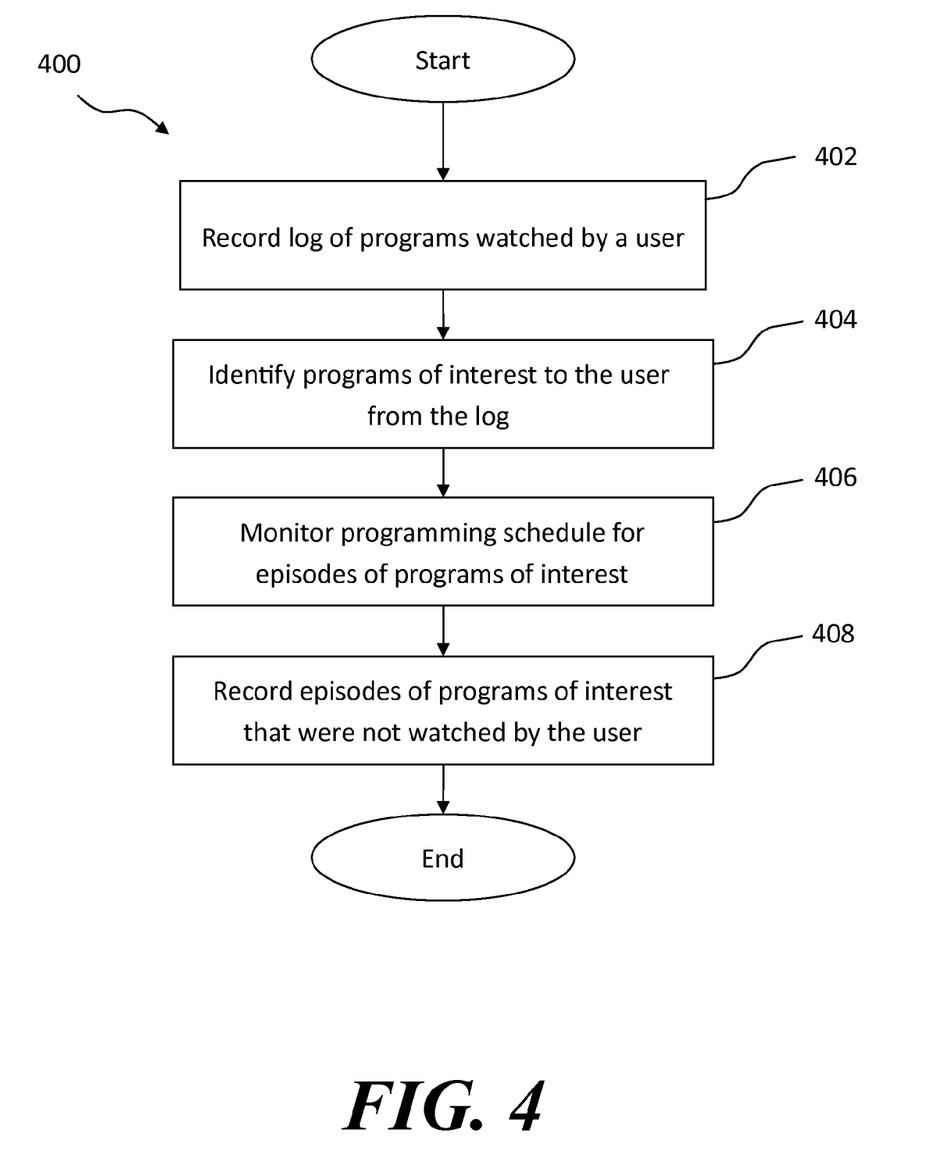
FIG. 4 is a flow chart showing a sequence of steps in an exemplary method of automatically recording an episode of a program of interest to a user, according to one embodiment.

FIG. 4 is a flow chart showing a sequence of steps in an exemplary method of automatically recording a program of interest to a user, according to one embodiment. The process 400 is implemented to detect and automatically record episodes of programs that the user 102 might be interested in, but that the user 102 failed to set a timer for, in one embodiment.

In step 402 the receiver 106 records a log of programs watched by the user. The receiver 106 is configured to detect when a user is watching an episode of a program.

In one embodiment the receiver 106 detects when the display 104 is receiving a selected episode of a program from the receiver 106. The log may also be determined by associating user inputs with a particular episode of a program. For example, a user may view an on screen programming guide and select a program from the guide. The selected programs could then populate the log of programs. In another embodiment different combinations of user inputs would be used to add a program to the log of programs, such as a channel change followed by an info button press.

In step 404 the receiver 106 identifies programs of interest to the user 102 from the log of programs through a background process. Any number of criteria can be used to identify programs of interest to the user 102. In one embodiment, the receiver identifies programs on the log of programs that the user watched two consecutive episodes of In another embodiment the receiver 106 identifies programs that have interest indicators that demonstrate a level of user interest that exceeds a level of user interest criteria.

In step 406 the receiver 106 reviews the programming schedule for the plurality of programs received from the service provider 302 to identify a next scheduled showing for the episode of the program of interest. The receiver 106 may search only for a limited time window, may search until the next scheduled showing is found, or may otherwise search until a null value is returned.

In other embodiments, step 406 is implemented in the network 100 and transmitted to the receiver 106. In this embodiment, a network device on the network 100 inspects the programming schedule for the episode of the program of interest. The network device then transmits the timing data for the next scheduled showing of the episode of the program of interest.

In yet another embodiment, the review of the programming schedule may include searching for a plurality of episodes of the program of interest. In this embodiment the receiver 106 or the network 100 identifies a number of scheduled showings of the program of interest from among the plurality of programs. The number of scheduled showings to search for may be a set number or may vary. A variable number of scheduled showings of the program of interest may vary according to the number of episodes remaining in the current season, may vary according to storage space limits, or may vary according to other factors.

In step 408 the receiver 106 records episodes of programs of interest according to the schedule of programs of interest identified in step 406. The step 408 may be implemented by recording all of the scheduled episodes of programs identified in the step 406, and then discarding ones that were watched in their entirety by the user 102. Alternatively, the step 408 may be implemented by only recording episodes of the scheduled programs identified in the step 406 that a user 102 is not watching.

Figure 5:
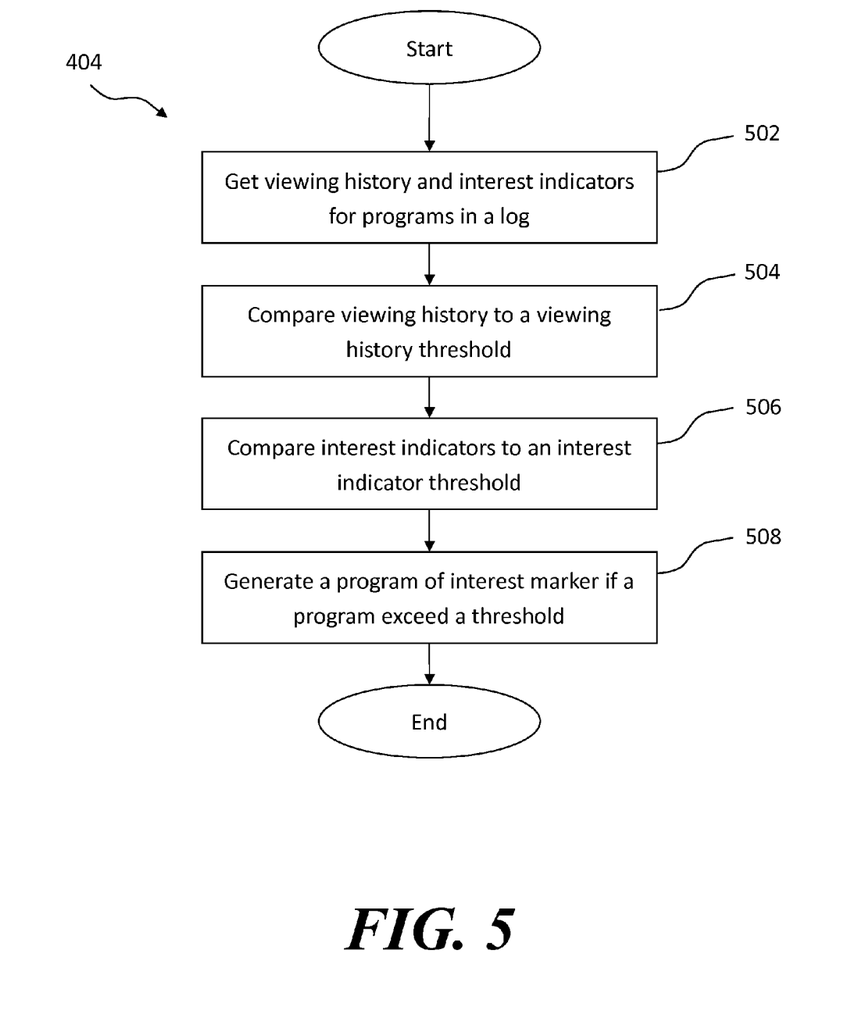
FIG. 5 is a flow chart showing a sequence of steps for the step of identifying a program as the program of interest by determining user viewing interest from the user's viewing history, according to one embodiment.

FIG. 5 is a flow chart showing a sequence of steps for the step of identifying a program as the program of interest by determining user viewing interest from the user's viewing history, according to one embodiment. As shown in FIG. 4, the process 400 includes the step 404 of identifying a program as a program of interest to the user from the log of programs. The step 404 may include additional steps in one embodiment, as shown in FIG. 5.

Step 502 includes getting history and interest indicators for programs entered on the log of programs. Getting viewing history can include getting the log of programs, or in another embodiment, getting the viewing history may include obtaining a detailed timing log of when the user 102 was receiving a program at the display 104. The detailed timing log can include notations for start and stop watching times and also timing data for commercial advertisements. The step 502 also includes getting interest indicators. The interest indicators may be in the form of timing data already received in the viewing history. In another embodiment, the interest indicators may include other data in addition to the timing data, such as user commands recorded during the watching of the episode of the program of interest.

In step 504 the viewing history is compared to a viewing history threshold. In one embodiment, the viewing history threshold is two consecutive scheduled showings of the program being watched by the user 102. Thus, a program may be identified as a program of interest by exceeding the viewing history threshold if the user 102 watches two consecutive episodes of the program. Specifically, if the program was scheduled for 7:00 pm on Fridays, then the program may exceed the viewing history threshold if the user watches a first episode of the program on a first Friday at 7:00 pm, and then watches a second episode of the program on the next Friday at 7:00 pm. It is possible that first-run episodes and reruns would be scheduled between one another, and in one embodiment the viewing threshold would only compare first-run episodes in comparing the viewing history to the viewing history threshold.

In other embodiments the step 504 includes the receiver 106 identifying a program that has newly aired. If the user watches a first scheduled episode of a season of a program, then the step 504 may determine that the viewing history satisfies the viewing history threshold.

Step 506 includes comparing interest indicators to an interest indicator threshold in one embodiment. The step 506 may include reviewing the viewing history of steps 502, 504 to determine interest indicators. In another embodiment data separate from the viewing history is collected in step 502 and used in step 506. In this embodiment data such as user input data is associated with a program in step 502 and compared in step 506 to an interest indicator threshold. The interest indicators compared in step 506 may include data such as a user 102 stopping or starting playback of an episode of a program, or a user 102 changing the volume of the episode of the program.

In one embodiment, the different interest indicators are ranked according to how indicative they are of interest from the user 102. For example, a user selecting info for a channel may indicate a moderate level of interest. The user 102 pausing or rewinding the episode of the program may indicate a high level of interest. The user 102 lowering the volume of the episode of the program may indicate a low level of user interest. It is also possible to distinguish between commands entered during a commercial advertisement compared to during the displaying of the episode of the program, enabling the receiver 106 to disassociate commands related to the commercial advertisements.

The ranking of the interest indicators in the comparing step 506 may be dynamic. The different interest indicators may be ranked against a benchmark ranking scale initially, and then in one embodiment, the receiver can adjust the benchmark ranking scale based on feedback from the user 102. Feedback from the user 102 may be obtained through interrogation of the user, or may be obtained by a background process of monitoring viewing history programs identified as programs of interest.

After the step 506 in which the interest indicators are compared to the interest indicator threshold, the receiver may generate a program of interest marker for the process 400 to use to identify programs of interest in step 508. The interest marker may be added to the log of programs or may be annotated separately.

Figure 6:
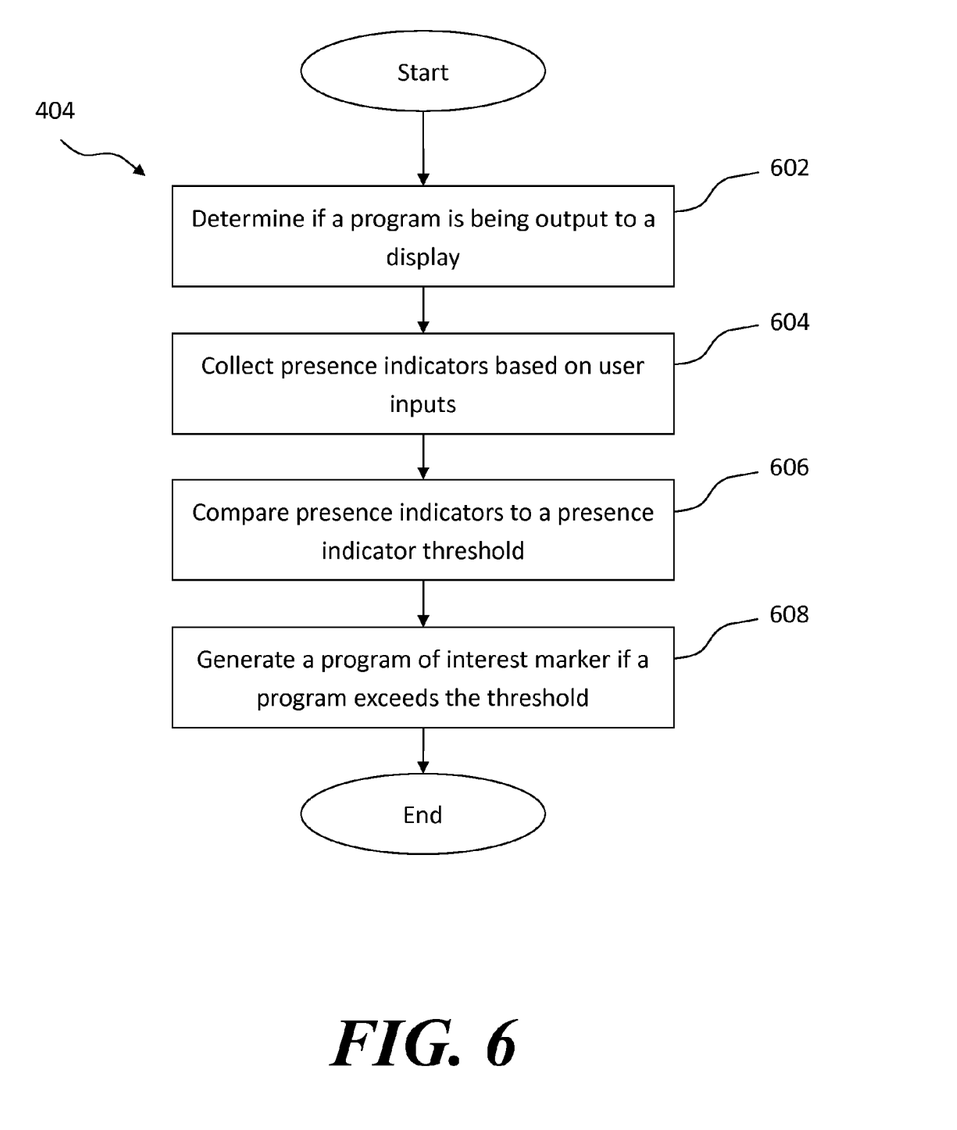
FIG. 6 is a flow chart showing a sequence of steps for the step of identifying a program as the program of interest by determining user presence, according to one embodiment.

FIG. 6 is a flow chart showing a sequence of steps for the step of identifying a program as the program of interest by determining user presence, according to one embodiment. FIG. 6 depicts an alternate embodiment from FIG. 5 of step 404, identifying a program of interest. In this alternate embodiment the receiver 106 determines if the display 104 is displaying the program being output from the receiver 106 in step 602. This may be accomplished by monitoring the transmission using a two-way communication protocol, such as a High Definition Multimedia Interface (HDMI) connection or a Universal Serial Bus (USB) connection.

In step 604, the receiver 106 collects presence indicators associated with a program being output to the display 104. Presence indicators may be user commands generated by the user 102 on the remote 110 and sent to the receiver 106. The presence indicators may alternatively be detected in another device and transmitted to the receiver 106. The presence indicators may be any action received at the receiver 106 or any detection of user presence received at the receiver 106.

Step 606 includes comparing the presence indicators collected in step 604 to a presence indicator threshold. The comparing may be a simple toggle between whether presence is detected or not, or the presence indicator threshold may be a more complex threshold requiring a combination of different weighted presence indications.

If a program exceeds the presence indicator threshold in step 606, then the receiver 106 identifies the program as a program of interest in step 608. In one embodiment, step 608 includes the receiver associating an interest marker with the identified program of interest.

Figure 7:
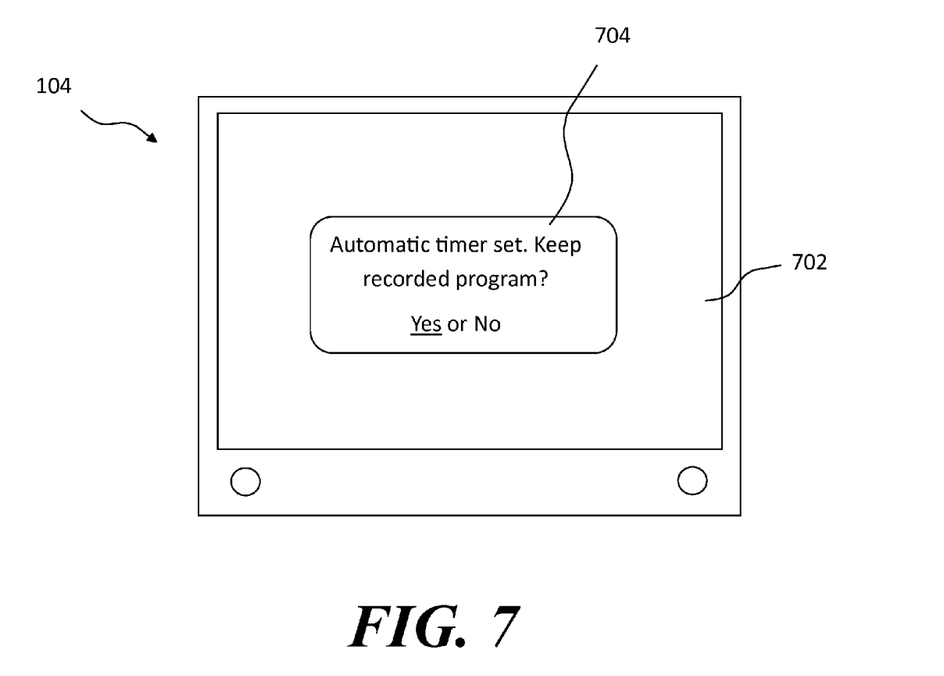
FIG. 7 is a front view of a display showing a recording notification box, according to one embodiment.

FIG. 7 is a front view of a display showing a recording notification box, according to one embodiment. When the receiver 106 records an episode of the program of interest by the background process, the receiver 106 may then notify the user 102 that the program of interest has been recorded. In one embodiment, a notification box 704 is displayed on a screen 702 of the display 104. The notification box 704 is shown in the middle of the screen 702, but may be located in any location within the screen 702.

In one embodiment, the notification box 704 is a temporary notification only. In this embodiment, the notification box may appear on the screen when the display is first turned on following the automatic recording of an episode of the program of interest. The notification box may instead be displayed at the next scheduled episode of the program of interest if the receiver 106 detects the user 102 watching the program of interest. The notification may last for only a set period of time (for example, 15 seconds), or may last until the user 102 provides an input to close the notification box 704.

The notification box 704 may notify the user 102 that the receiver 106 has automatically recorded the episode of the program of interest. The notification box 704 may also notify the user of the details of the recording, such as time and channel of the recording, or episode of the program event details such as general synopsis, run time, rating or other similar information. Alternatively, the notification box 704 may be a notification of recording and a request for user input. The request for user input can be a request on whether to begin playback of the recorded episode of the program of interest, may be a request on whether to save the recording of the episode of the program of interest for an extended period, or may be some other request related to the recording of the episode of the program of interest.

In FIG. 7 the user 102 is asked for input on whether or not to keep the automatic recording of the episode of the program of interest. In the shown embodiment, the receiver 106 has recorded a scheduled episode of a program of interest that the user 102 has missed at least part of The receiver 106 then causes the notification box 704 to be displayed in the screen 702 when the receiver 106 next detects the user 102 watching the display 104. The notification box notifies the user 102 that a recording of the episode of the program of interest has been made, and requests the user 102 provide input on whether to preserve the recording. If the user 102 selects "Yes" to keep the recorded episode of the program of interest, the receiver 106 preserves the recording and manages the saved recording similarly to a recording done at the instruction of the user 102. If the user 102 selects "No," to discard the recorded episode of the program, the program of interest is marked for deletion. The receiver 106 may actively delete the recorded episode of the program of interest marked for deletion, or may instead overwrite the recorded episode of the program of interest marked for deletion as space becomes needed in memory.

Figure 8:
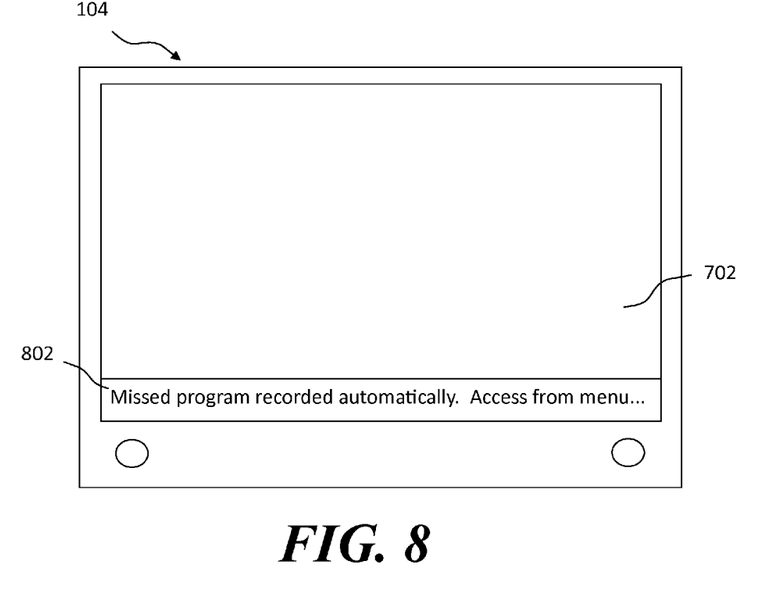
FIG. 8 is a front view of a display showing a recording banner, according to one embodiment.

FIG. 8 is a front view of a display showing a recording banner, according to one embodiment. The notification banner 802 is shown on the bottom of the screen 702 of the display 104 in FIG. 8, but in other embodiments the notification banner may be in any location within the screen 702.

The notification banner 802 in some embodiments may be similar to the notification box 704 in functionality, but in other embodiments may include different features. For instance, the notification banner 802 may be persistent, being displayed on the screen 702 multiple times, or for an extended period. The extended period may even continue through multiple power cycles of the display 104 or the receiver 106.

The notification banner 802 may be in a full text presentation or in a scrolling presentation format. In the scrolling presentation format a string of text is presented scrolling from right to left. In the scrolling format the text may scroll continuously, may scroll in discrete segments, or may scroll using a combination of the two, such as scrolling continuously until a paragraph break, in which the scrolling stops for a period of time, and then resumes either from where it stopped, or the scrolling jumps to the next paragraph.

The notification banner 802 may be used only as notification, or may be both notification and a request for user input. In embodiments in which the notification banner 802 is only used for notification, the notification banner 802 may notify the user 102 that an automatic recording of the episode of the program of interest has been made. In other embodiments, the notification banner may also notify the user how to access the recording. In further embodiments, the notification may be that an automatic timer has been set by the receiver prior to the automatic recording of the episode of the program of interest.

In another embodiment the notification banner 802 may request user input. Examples of types of user input that may be requested include input from the user 102 to save the recording of the episode of the program of interest, to save the automatic timer for the episode of the program of interest, or other similar types of requests.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving a plurality of programs at a receiver;
displaying a first episode in a series of a selected program for viewing by a user;
generating an entry in a log of selected programs for the selected program;
determining a level of user interest for the selected program by a background process, the background process including:
 determining if the user is present by detecting user commands during the displaying of the first episode of the selected program;
 comparing a viewing history of the selected program to a first criteria;
 comparing a group of interest indicators associated with the selected program to a second criteria;
 determining the level of user interest based on a result of whether the user was present during the displaying of the first episode of the selected program, a result of the comparing of the viewing history to the first criteria, and a result the comparing of the group of interest indicators to the second criteria;
ranking the selected program by the background process to determine if the selected program is a program of interest, the ranking based on the level of user interest;
associating an interest marker with the selected program when the selected program is determined to be the program of interest;
determining if the user selects the second episode of the selected program for viewing; and
recording a second episode in the series of the selected program when the user does not select the second episode of the selected program for viewing.

2. The method of claim 1, further comprising:
displaying a notice indicating that the second episode of the program of interest has been recorded.

3. The method of claim 2, wherein the displaying a notice includes a request for user input on whether to continue to store the second episode of the program of interest.

4. The method of claim 1, further comprising:
storing the recording of the second episode of the program of interest for a set time period.

5. The method of claim 1, further comprising:
storing the recording of the second episode of the program of interest until attempted storage of recordings exceeds capacity.

6. The method of claim 1, wherein the background process determining of the level of user interest is based in part on whether the first episode of the selected program is a first run or a rerun.

7. The method of claim 1, wherein the background process determining of a level of user interest is based in part on whether the first episode of the selected program is watched for more than half of the episode.

8. The method of claim 1, wherein the detecting user commands includes detecting a user activating a pause feature during the displaying of the first episode of the selected program.

9. The method of claim 1, wherein the detecting user commands includes detecting a user navigating away from the first episode of the selected program, and returning to the first episode of the selected program.

10. The method of claim 1, wherein the determining a level of user interest includes determining if more than one consecutive episode of the selected program has been watched by the user.

11. A method, comprising:
detecting a program of interest from a plurality of programs, the detecting including,
 determining if a first episode of a first program is being displayed by collecting a viewing history by a background process;
 comparing the viewing history to a first criteria;
 determining if a user is interested in the first program by collecting a first group of interest indicators associated with the first program by the background process, the background process including determining if the user is present by detecting user commands during the displaying of the first episode of the first program;
 comparing the first group of interest indicators to a second criteria; and
 identifying the first program as the program of interest based at least in part on the comparing of the viewing history to the first criteria and the comparing of the first group of interest indicators to the second criteria;
detecting if a second episode of the program of interest is being displayed; and
recording the second episode of the program of interest when the second episode of the program of interest is not being displayed.

12. The method of claim 11, further comprising:
notifying the user that the second episode of the program of interest has been recorded at a next instance when the user is watching a selected program from the plurality of programs; and
offering to save the recording of the second episode of the program of interest for the user.

13. The method of claim 11, further comprising:
receiving population data from an external server, the population data representative of program interests of a subset of a general population of viewers, the determining if the user is interested in the first program including comparing the viewing history to the population data.

14. The method of claim 11, further comprising:
determining if a first episode of a second program is being displayed by collecting a viewing history by the background process;
determining if the user is interested in the second program by collecting a second group of interest indicators associated with the second program by the background process, the first and second groups of interest indicators relating common characteristics across the plurality of programs;
comparing the second group of interest indicators to a third group of interest indicators; and
identifying the second program as the program of interest based at least in part on the comparing the second group of interest indicators to the third group of interest indicators.

15. The method of claim 11, wherein the comparing the viewing history includes determining if more than one consecutive episode of the program has been viewed by the user.

16. A method, comprising:
identifying a program of interest, the identifying including,
receiving a plurality of programs;
selecting a first episode of a program to display from the plurality of programs;
entering the program into a log of selected programs;
determining a plurality of user interest indicators associated with the selected program, the determining the plurality of user interest indicators including determining if a user is present by detecting user commands during the displaying of the first episode of the program;
entering the user interest indicators into the log of selected programs;
comparing the plurality of user interest indicators in the log of selected programs to a first criteria
determining if the program is the program of interest based at least in part on a result of the comparing of the plurality of user interest indicators in the log of selected programs to the first criteria;
setting a timer for the program of interest to record a second episode of the program of interest;
determining whether the user selects the second episode of the program of interest for display; and
recording the second episode of the program of interest when not selected for display.

17. The method of claim 16, further comprising:
notifying the user that the timer was set for the second episode of the program of interest if the program of interest was not selected for viewing.

18. The method of claim 16, wherein the detecting user commands includes detecting the user commanding a video receiver to rewind the program.

19. The method of claim 16, wherein the determining user interest indicators includes determining what sports team the first episode of the program is associated with and the determining if the second episode of the program is part of the program of interest based at least in part on the sports team identified.

20. The method of claim 16, wherein the determining user interest indicators includes determining if more than one consecutive episode of the program has been viewed by the user.

* * * * *